United States Patent

Ault et al.

[15] 3,704,383

[45] Nov. 28, 1972

[54] TRANSISTOR-TRANSISTOR LOGIC CLIPPING CIRCUIT

[72] Inventors: Cyrus Frank Ault, Wheaton; Ray Allen Reed, Bolingbrook; William George Reichert, Jr., Wheaton, all of Ill.

[73] Assignee: Bell Telephone Laboratories, Incorporated, Murray Hill, Berkeley Heights, N.J.

[22] Filed: Dec. 3, 1971

[21] Appl. No.: 204,475

[52] U.S. Cl. ..................307/237, 307/213, 307/215, 307/299 A

[51] Int. Cl. ..........................H03k 5/08, H03k 19/08

[58] Field of Search ...........307/215, 237, 299 A, 213

[56] References Cited

UNITED STATES PATENTS

| | | | |
|---|---|---|---|
| 3,518,449 | 6/1970 | Chung | 307/237 X |
| 3,553,486 | 1/1971 | Dow | 307/237 X |

*Primary Examiner*—John Zazworsky
*Attorney*—R. J. Guenther et al.

[57] ABSTRACT

The invention is a combination of a transistor-transistor logic (TTL) gate and a multi-emitter transistor clipping circuit having a different emitter connected to each input of the gate. The multi-emitter transistor is biased so that any signal, reflected by an input of the gate and tending to pull the potential of that input below ground, causes the transistor to conduct and clip the input signal essentially at ground potential.

7 Claims, 3 Drawing Figures

TRANSISTOR-TRANSISTOR LOGIC CLIPPING CIRCUIT

BACKGROUND OF THE INVENTION

1. Field of the Invention

The invention is a transistor-transistor logic (TTL) input clipping circuit that is more particularly described as an offset-compensated multi-emitter transistor clipping circuit.

2. Description of the Prior Art

During the operation of fast TTL circuits at low voltage levels such as in the operation of a TTL gate disclosed in a copending patent application made in the names of R. A. Pedersen, R. A. Reed, and M. D. Underwood, Ser. No. 12,997, filed Feb. 20, 1970 now U.S. Pat. No. 3,629,609 signals between gates are subjected to transmission line effects. These effects occur because the TTL gate current rise time is less than the delay imparted to signals transmitted over some of the interconnections between gates. Such effects become a problem in the operation of the TTL gates when a first gate changes from nonconducting to conducting and thereby transmits a negative-going transient (from approximately one volt to ground) over several inches of interconnections toward the input of a second gate.

The input impedance of the second gate is not matched with the characteristic impedance of the interconnection and therefore causes a first reflection. Because the input impedance is greater than the characteristic impedance of the interconnection and has a coefficient of reflection approximately equal to a positive six-tenths, the magnitude of the input transient is increased from approximately nine-tenths of a volt of approximately one and one-half volts. Thus the high input impedance causes the first-reflected signal to have a negative polarity and a magnitude of approximately one-half volt. The first-reflected signal is of course directed toward the output of the first gate.

The output impedance of the first gate is not matched with the characteristic impedance of this interconnection and also causes a reflection. Because the first gate is conducting, its output impedance is much less than the characteristic impedance of the interconnection. The coefficient of reflection is approximately equal to a negative eight-tenths, and the resulting second-reflected signal (reflected from the output of the first gate toward the input of the second gate) is a positive signal having a magnitude of three to four tenths of a volt.

This second-reflected signal, which has positive polarity and is subjected to being approximately doubled at the input of the second gate, is a logical complement of the ground level signal that is supposed to be transmitted for correctly representing the information state of the first gate. Because of this positive signal and the low TTL gate current rise time, the second gate now responds to the positive signal rather than the original ground level signal. The threshold voltage of the second gate is lower than the resulting positive signal which causes the second gate to conduct. As a result, the second gate is constrained to conduct erroneously in response to the positive signal reflected from the output of the first gate.

In the prior art, diodes have been interposed in the inputs of TTL gates for preventing erroneous operation of such gates in response to erroneous reflected signals.

Such prior art diodes are arranged to clip reflected signals at a potential that is offset below ground by approximately one forward-biased p-n junction drop. When reflected signals are thus clipped at one forward-biased p-n junction drop below ground, the reflected signals retain sufficient magnitude to cause erroneous operation of TTL gates having a threshold less than one forward-biased p-n junction drop, like the threshold of the gate disclosed in the aforementioned Pedersen et al patent application.

Thus, there exists a need for a TTL input clipping circuit which is offset-compensated so that if clips input signals at a potential offset from ground by much less than a forward-biased p-n junction drop.

SUMMARY OF THE INVENTION

It is an object of the invention to improve the operation of TTL circuits.

It is another object to reduce erroneous operation of TTL circuits in response to reflected input signals.

These and other objects are realized by a combination of a TTL gate and a multi-emitter transistor clipping circuit having a different emitter connected to each input terminal of the gate. The base of the multi-emitter transistor is biased at a potential that is offset by one forward-biased p-n junction drop from ground.

As a result, any signal, reflected by an input of the gate and tending to pull the potential of that input below ground, causes the multi-emitter transistor to conduct and clip input signals essentially at ground potential.

It is a feature of the invention to use a multi-emitter transistor to clip input signals applied to a TTL gate.

It is another feature to bias the base to the transistor clipping circuit at a quiescent potential essentially one forward-biased p-n junction drop from ground.

It is a further feature to offset the base electrode bias by inserting a resistor and diode voltage divider between the collector source voltage and ground and by connecting an intermediate junction of the voltage divider to the base electrode of the transistor clipping circuit.

It is also an object to fabricate a TTL circuit and its multi-emitter transistor clipping circuit as a single planar silicon integrated circuit.

BRIEF DESCRIPTION OF THE DRAWING

A better understanding of the invention may be derived from the detailed description following, if that description is considered with respect to the attached drawing wherein.

DETAILED DESCRIPTION

Figure 1:
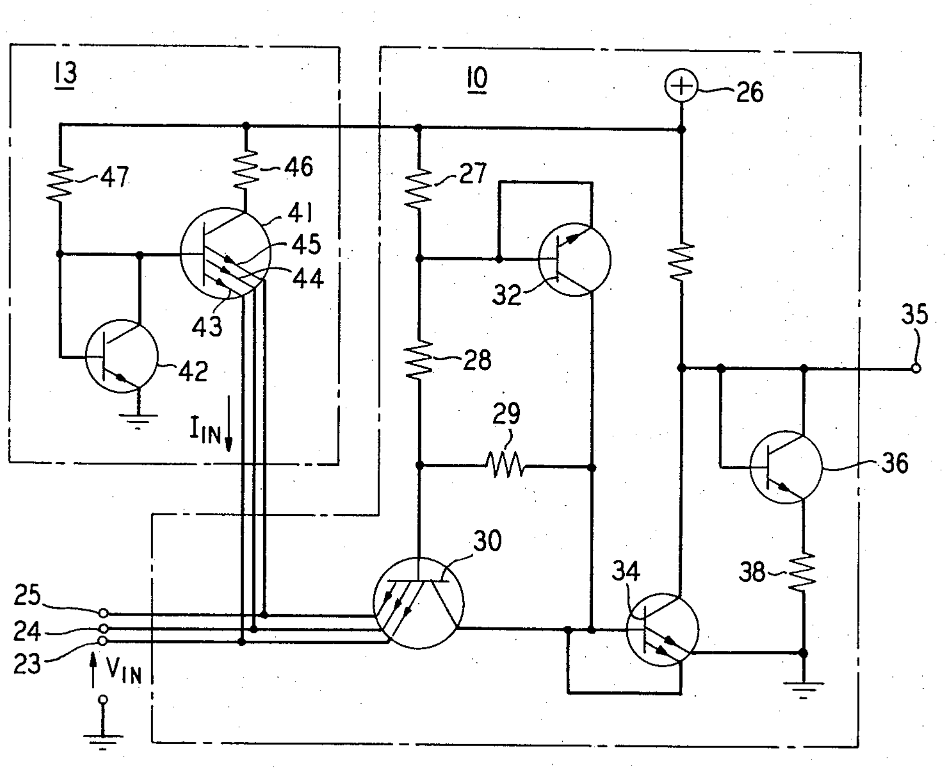
FIG. 1 is a schematic diagram of a circuit arranged in accordance with the invention.

Referring now to FIG. 1, there is shown a schematic diagram of a fast operating low-threshold TTL gate 10 and a multi-emitter transistor clipping circuit 13. The TTL gate 10 is similar to the TTL gate described in the aforementioned patent application in the names of R. A. Pedersen et al. The TTL gate 10 generally is fabricated as a planar silicon integrated circuit incorporating the collector diffusion isolation techniques disclosed by B. T. Murphy et al in the Proc. of the IEEE, Sept. 1969, pages 1523–1527, and by P. A. Gary et al in the IEEE Journal of Solid-State Circuits, Oct. 1970, pages 227–235.

Basically, the TTL gate 10 is a low-level logic circuit for performing a NAND logic function. Logic Level "1" and logic level "0" input signals are received respectively as approximately one volt and approximately ground potential on input terminals, or leads, 23, 24 and 25. The threshold voltage is less than one forward-biased p-n junction drop.

Whenever a logic level "0" signal of approximately ground potential is applied to one or more of the input leads, such as on lead 23, a significant current occurs in a path from a power supply 26 through resistors 27, 28, and 29 and a collector-emitter path of an NPN input transistor 30 to the ground potential on the input lead 23. At such a time, a diode-connected NPN transistor 32 connected in the base-collector circuit of the transistor 30 is forward-biased sufficiently to divert significant current in parallel with the resistors 28 and 29 to the collector of the transistor 30. At the same time, a small base current is conducted by the transistor 30, and it is biased for forward conduction near saturation. The transistor 30 does not saturate because the transistor 32 shunts current away from the base and to the collector.

A base-emitter junction of NPN output transistor 34 is forward-biased by a potential which is insufficient to cause significant conduction therethrough.

Output signals comprising a NAND logic function of the input signals are produced on an output terminal, or lead, 35. As a result of the logic level "0" signal on the input lead 23, the level of the potential on output lead 35 is clamped at approximately one volt by a diode-connected NPN transistor 36 and a resistor 38. This one volt on the output lead 35 represents a logic level "1" output signal which occurs if a level "0" signal is applied to one or more of the input leads 23, 24, and 25.

Upon concurrence of logic level "1" signals on all three input leads 23, 24, and 25, the base-emitter junctions of the transistor 30 remain forward-biased, and current still is conducted from the power supply 26 through the resistors 27, 28, and 29 and the transistor 32. This current is conducted to ground in the emitter circuit of the transistor 34. In addition the transistor 30 now is biased to conduct inverse-mode collector current, which also is conducted too ground through transistor 34. The transistor 34 conducts in saturation in the forward-mode. As a result, potential on the output lead 35 goes to approximately ground potential representing a logic level "0" output signal.

Output signals of the TTL gate therefore are approximately one volt for a logical "1" and approximately ground for a logical "0." More than ten milliamps of output current can be supplied through the output lead 35 when the logic level "0" occurs at the output.

When TTL gates similar to the gate 10 are interconnected in a logic chain, not shown, the output of at least a first of such TTL gates is interconnected with one input of a second of such TTL gates. The output signals of one volt and zero volt from the first TTL circuit therefore become the input signals to the second TTL circuit.

Although the output of the first TTL circuit can supply several milliamps of current for the output logic level "1," the input (for instance input 23) of the second TTL gate is limited to conducting approximately one milliamp. Thus if there is a long interconnection between the gates and if a transition occurs from one volt to zero volt in the output of the first TTL circuit, the input 23 of the second TTL circuit tends to fall to a potential below ground as previously described. Such a signal transition from one volt to zero volt is shown at time T1 in FIG. 2. A dotted waveform 33 indicates the tendency of the input 23 to fall below ground potential and ring as reflections travel back and forth between the first and second TTL gates.

Figure 2:
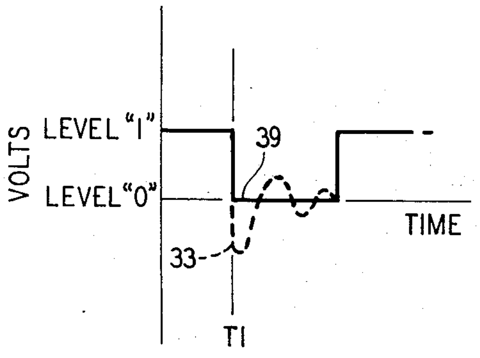
FIGS. 2 and 3 are waveforms depicting operation of the circuit of FIG. 1.

At such time T1, the multi-emitter transistor input clipping circuit 13 of FIG. 1 commences clipping the potential of the input 23 at approximately ground potential, as shown by the waveform 39 ofF FIG. 2, and thereby prevents the potential of input 23 from swinging to any significant negative potential, like the negative potentials shown in the waveform 33.

In the clipping circuit 13 of FIG. 1, a multi-emitter NPN transistor 41 has different emitter electrodes 43, 44, and 45 connected respectively to each of the input terminals 23, 24, and 25 of the TTL gate. A collector of the transistor 41 is connected by way of a resistor 46 to the supply 26, and the base thereof is biased by a voltage divider which includes a resistor 47 and a diode-connected NPN transistor 42.

The collector resistor 46 is included in the circuit to provide protection for the transistor 41 in case of failure of the power supply 26. Resistor 46 has a value sufficient to limit the collector current of the transistor 41 to less than 15 milliamps during breakdown conditions when the emitter-collector voltage drop rises to 3.5 volts.

The resistor 47 and the transistor 42 are connected in series circuit between the power supply 26 and ground. A common junction between the resistor 47 and the transistor 42 is connected to the base electrode of the transistor 41 for maintaining the base bias of the transistor 41 at approximately one forward-biased p-n junction potential from ground. The base-collector junction of the transistor 42 is short-circuited, and the emitter thereof is grounded. Resistor 47 is selected so that at least one milliamp of current is conducted through the resistor 47 and the diode-connected transistor 42 when the transistor 41 is cut off or is conducting moderately. When transistor 42 is conducting such current, the voltage drop across its base-emitter junction is equal to the drop across a fully conductive forward-biased p-n junction and is the base bias applied to the transistor 41.

Transistors 41 and 42 are fabricated in the same integrated circuit silicon substrate so that their conduction characteristics track relatively close to each other. Thus an equal change of base-emitter voltage on both devices causes proportional changes of current conducted there-through.

Before describing the operation of the transistor 41, it is noted that the $\beta$ of transistor 41 generally is equal to or greater than 30. In addition it is noted that the transistors 31 and 42 generally are fabricated to have like size emitters but at times it is advantageous to make the transistor 42 with a larger emitter than the emitters of the transistor 41 as long as the conduction characteristics of the two transistors 41 and 42 track each other.

In operation, the transistor 41 becomes conductive when one or more of the input signals change from the logic level "1" to the logic level "0," as shown at time T1 in FIG. 2. Usually only one of the input signals changes at a time, however, it is possible that two or more input signals can change simultaneously.

Assuming that the signal on the input lead 23 goes from one volt to zero volt while the signals on leads 24 and 25 remain at one volt, the transistor 41 is biased into conduction. Operation of the transistors 41 and 42 at such a time may be best understood by the derivation and interpretation of an expression for the input current $I_{IN}$ which is conducted form the emitter 43 to the lead 23 in response to input voltage $V_{IN}$ which is applied between ground and the lead 23.

Such an expression for the current $I_{IN}$ is derived by summing voltage drops around the input loop of the clipping circuit wherein $V_{IN} = V_{BE2} - V_{BE1}$. $V_{BE1}$ and $V_{BE2}$ are base-emitter voltage drops respectively of the transistors 41 and 42. Equivalent expressions must be substituted into the equation for the aforementioned voltage drops.

In the foregoing equation and in additional equations following, the numerical subscripts 1 and 2 are associated respectively with the transistor 41 and the transistor 42.

An equivalent expression for $V_{BE1}$ is derived from the Ebers-Moll model as applied to the transistor 41. Collector current $I_{C1}$ conducted through the multi-emitter transistor 41 is represented by $$I_{C1}=\frac{\alpha_{N1}I_{EO1}}{1-\alpha_{N1}\alpha_{I1}}(\epsilon^{\theta V_{BE1}}-1)-\frac{I_{CO1}}{1-\alpha_{N1}\alpha_{I1}}(\epsilon^{\theta V_{BC1}}-1) \quad (1)$$

wherein $\theta = g/nkt$ and $\alpha_{N1}$ and $\alpha_{I1}$ respectively are the normal $\alpha$ and inverse $\alpha$ for transistor 41. All other symbols are standard IEEE symbols referred to the transistor 41.

In the foregoing equation $I_{ES1}$ can be substituted for $\alpha_{N1}I_{EOA}$⅔$1-\alpha_{N1}\alpha_{I1}$ . It is noted that during operation $V_{BC1}$ is greater than −.2 volt (because the collector junction is reverse-biased) and that therefore the last term of the equation is insignificantly small in comparison to the first term. Whenever $V_{BE1}$ is greater than .2 volt (during the transition from logic level "1" to logic level "0" ), the −1 of the first term becomes insignificantly small and $I_{C1} = {}_{IES1}\ \epsilon^{\theta V BE1}$. This expression is readily converted into the desired equivalent expression for $V_{BE1}$ which is $V_{BE1} = {}_{1/}\theta\ 1n\ [I_{C1}/I_{ES1}]$.

An equivalent expression for $V_{BE2}$ also is derived from the Ebers-Moll transistor model, but as applied to the transistor 42. The current $I_{C2}$ conducted through the diode-connected transistor 42 is represented by $$I_{C2}=\frac{\alpha_{N2}I_{EO2}}{1-\alpha_{N2}\alpha_{I2}}(\epsilon^{\theta V_{BE2}}-1)-\frac{I_{CO2}}{1-\alpha_{N2}\alpha_{I2}}(\epsilon^{\theta V_{BC2}}-1) \quad (2)$$

Symbols used in the foregoing expression are similar to the symbols used with respect to transistor 41 except that each subscript 2 refers to a parameter related to the transistor 42.

It is noted that $V_{BC2}$ = O and that $I_{ES2}$ can be substituted for $\alpha_{N2}I_{EO2}/1-\alpha_{N2}\alpha_{I2}$ . Then $I_{C2} = I_{ES2}\ (\epsilon^{\theta V_{BE2}}-1)$. During a transition from logic level "1" to logic level "0" and as soon as $V_{BE2}$ is greater than .2 volt, $I_{C2} = I_{ES2}\ \epsilon^{\theta V_{BE2}}$. This expression for $I_{C2}$ is readily converted into the desired equivalent expression for $V_{BE2}$ wherein $V_{BE2} = 1/\theta\ 1n\ [I_{C2}/I_{ES2}]$.

When the foregoing equivalent expressions for $V_{BE1}$ and $V_{BE2}$ are substituted into the input loop equation, $$V_{IN} = 1/\theta\ 1n\ [I_{C2}/I_{ES2} \cdot {}^{I}{}_{ES1}/I_{C1}]. \quad (3)$$

The terms $I_{ES1}$ and $I_{ES2}$ are related to the geometry of the transistors 41 and 42 and are equal to each other when the emitter areas of the transistors41 and 42 are equal to each other. Thus when those areas are equal, $$V_{IN} = 1/\theta\ 1n\ [I_{C2}/I_{C1}]. \quad (4)$$

Figure 3:
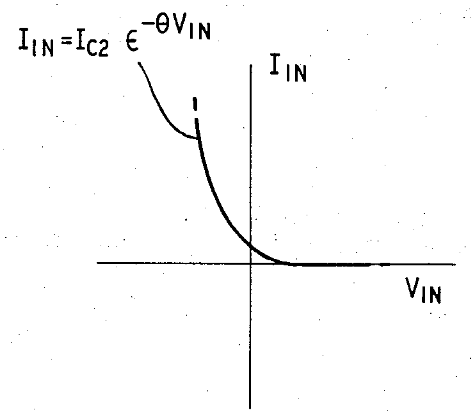

In addition $I_{C1} = I_{IN}$, and therefore $I_{C2}/I_{IN} = \epsilon^{-\theta V_{IN}}$. This expression is readily converted into the desired expression for the input current, which is $I_{IN} = I_{C2}\ \epsilon^{-\theta V_{IN}}$ . A waveform of the input current $I_{IN}$ is illustrated in FIG. 3.

Thus within relevant limits for an input signal transistor from logic level "1" to logic level "0," the input current $I_{IN}$ conducted through an emitter of the multi-emitter transistor 41 rises exponentially for negative polarity input signal voltages $V_{IN}$. This exponentially rising current response to negative polarity input signals clips the input potential essentially at ground potential whereas prior art circuits clipped at a potential offset from ground potential by a forward-biased p-n junction drop. The potential at which the input terminals of the TTL gate are clipped by the subject invention is close enough to ground so that any reflected signals have insufficient amplitude to cause erroneous operation of the TTL gate 10.

Because of the biasing arrangement of the transistor clipping circuit 13 of FIG. 1, the transistor 41 is cut off when the input signal $V_{IN}$ is at the logic level "1" and conducts only moderately when the input signal is held at logic level "0." The moderate conduction through the transistor 41 in response to an input logic level of "0" is cut off when the input logic level changes to "1." For the steady state condition of both input logic levels "1" and "0" and for the transition of the input from the logic level "0" to the logic level "1", the transistor 41 has a high input impedance and has little effect on the operation of the TTL gate. Thus the transistor clipping circuit 13 has little or not effect on the operation of the TTL gate except when one or more of the input leads tend to fall to a negative below-ground potential in response to an input signal transient caused by a change from the logic level "1" to the logic level "0."

The accompanying drawing and the foregoing description are illustrative of a TTL gate and a clipping circuit using NPN transistors. It is clear that opposite conductivity type of transistors can be utilized in the TTL gate and the clipping circuit if power supply polarities shown in the drawings are properly altered in accordance with well-known principles.

The foregoing discussion described an embodiment of the invention. Other embodiments thereof are considered to be obvious in view of the embodiment described. The embodiment described together with those additional embodiments all are considered to fall within the scope of the invention.

What is claimed is:

1. A circuit comprising a TTL gate having plural input terminals, each terminal being adapted for receiving a signal of either a first or a second potential, means for clipping the signals applied to the input terminals substantially at the first potential, the clipping means including a common-base connected multi-emitter transistor, means for connecting a different emitter electrode of the transistor to each input terminal of the gate, and means for biasing a base electrode of the transistor at a potential offset by one forward-biased p-n junction drop from the first potential.

2. A circuit in accordance with claim 1 further comprising a source of fixed potential applied to a collector electrode of the transistor, the biasing means including a resistor and a diode connected in series circuit between the fixed potential source and the first potential, the diode being forward-biased during quiescent operation, and means connecting a junction between the resistor and the diode to the base electrode of the transistor.

3. A circuit in accordance with claim 2 wherein operating characteristics of the diode are closely matched with operating characteristics of base-emitter junctions of the transistor.

4. A circuit in accordance with claim 3 wherein the diode is fabricated as a transistor with base and collector electrodes short-circuited by a conductor and wherein the diode and the transistor are constructed as one planar silicon integrated circuit.

5. A planar integrated semiconductor circuit comprising a TTL gate having plural input terminals, means for clipping signals applied to the input terminals, the clipping means including a multi-emitter transistor having a different emitter electrode connected to each input terminal of the gate, and means for biasing the multi-emitter transistor so that it conducts an emitter current $I_{IN}$ substantially equal to $I_{C2}\ \epsilon^{-\theta V_{IN}}$, wherein $I_{C2}$ is a reference current, $\epsilon$ is the base of natural logarithms, $\theta$ is a temperature dependent factor, and $V_{IN}$ is an input signal voltage on one of the input terminals.

6. A circuit in accordance with claim 5 wherein the biasing means comprise a diode conducting the current $I_{C2}$, said diode is referenced at one of its terminals by a voltage that is substantially equal to one level of two input signal levels applied alternatively to the terminals, said diode is connected directly from its other terminal to a base electrode of the transistor.

7. A circuit in accordance with claim 6 wherein the biasing means further comprise a source of reference potential connected to a collector electrode of the transistor, and a resistor coupling the source to the base electrode of the transistor.

* * * * *

UNITED STATES PATENT OFFICE
CERTIFICATE OF CORRECTION

Patent No. 3,704,383 Dated November 28, 1972

Inventor(s) Cyrus F. Ault, Ray A. Reed, & William G. Reichert, Jr.

It is certified that error appears in the above-identified patent and that said Letters Patent are hereby corrected as shown below:

Col. 1, line 26, change "interconnections" to read --interconnection--;

line 34, change "of", second occurrence, to read --to--;

line 41, change "this" to read --the--.

Col. 2, line 12, change "if" to read --it--.

Col. 3, line 7, change "Level" to --level--;

line 29, after "of" insert --an--;

line 51, after "conducted" change "too" to read --to--.

Col. 4, line 3, change "1" to --"0"--;

line 18, change "ofF" to --of--.

Col. 5, line 15, change "form" to read --from--;

line 38, the formula should read $$-- \theta = \frac{q}{nKt} --;$$

line 44, the formula should read $$-- \frac{\alpha_{N1} I_{E01}}{1-\alpha_{N1}\alpha_{I1}} --;$$

UNITED STATES PATENT OFFICE
CERTIFICATE OF CORRECTION

Patent No. 3,704,383 Dated November 28, 1972

Inventor(s) Ault et al

It is certified that error appears in the above-identified patent and that said Letters Patent are hereby corrected as shown below:

Col. 5, line 51, the formula should read $$-- I_{C1} = I_{ES1}\, \varepsilon^{\theta V_{BE1}} --;$$

line 53, the formula should read $$-- V_{BE1} = \frac{1}{\theta} \ln \left[\frac{I_{C1}}{I_{ES1}}\right] --;$$

line 67, the first formula should read $$-- \frac{\alpha_{N2} I_{EO2}}{1-\alpha_{N2}\alpha_{I2}} --.$$

Col. 5, line 67 to Col. 6, line 1, the formula should read $$-- I_{C2} = I_{ES2} \left(\varepsilon^{\theta V_{BE2}} - 1\right) --.$$

Col. 6, line 5, the formula should read $$-- V_{BE2} = \frac{1}{\theta} \ln \left[\frac{I_{C2}}{I_{ES2}}\right] --;$$

line 8, the formula should read $$-- V_{IN} = \frac{1}{\theta} \ln \left[\frac{I_{C2}}{I_{ES2}} \cdot \frac{I_{ES1}}{I_{C1}}\right] --;$$

UNITED STATES PATENT OFFICE
CERTIFICATE OF CORRECTION

Patent No. 3,704,383 Dated November 28, 1972

Inventor(s) Ault et al

It is certified that error appears in the above-identified patent and that said Letters Patent are hereby corrected as shown below:

Col. 6, line 15, the formula should read $$-- V_{IN} = \frac{1}{\theta} \ln \left[ \frac{I_{C2}}{I_{C1}} \right] --;$$

line 16, the formula should read $$-- \frac{I_{C2}}{I_{IN}} = \varepsilon^{\theta V_{IN}} -- ;$$

line 22, delete "transistor" and substitute therefor --transition--;

line 48, "not" should read --no--;

line 60, "described" should read --describes--.

Signed and sealed this 17th day of September 1974.

(SEAL)
Attest:

McCOY M. GIBSON JR.
Attesting Officer

C. MARSHALL DANN
Commissioner of Patents